United States Patent
Kook et al.

(10) Patent No.: US 9,920,817 B2
(45) Date of Patent: Mar. 20, 2018

(54) PLANETARY GEAR TRAIN OF AN AUTOMATIC TRANSMISSION FOR A VEHICLE

(71) Applicant: HYUNDAI MOTOR COMPANY, Seoul (KR)

(72) Inventors: Jae Chang Kook, Hwaseong-si (KR); Hyun Sik Kwon, Seoul (KR); Ki Tae Kim, Incheon (KR); Wonmin Cho, Hwaseong-si (KR); Seong Wook Hwang, Gunpo-si (KR); Seongwook Ji, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/375,736

(22) Filed: Dec. 12, 2016

(65) Prior Publication Data

US 2017/0268630 A1  Sep. 21, 2017

(30) Foreign Application Priority Data

Mar. 16, 2016  (KR) .......................... 10-2016-0031478

(51) Int. Cl.
*F16H 3/66* (2006.01)

(52) U.S. Cl.
CPC ....... *F16H 3/66* (2013.01); *F16H 2200/0073* (2013.01); *F16H 2200/0086* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| 7,789,792 | B2 * | 9/2010 | Kamm | F16H 3/66 475/277 |
| 7,988,586 | B2 | 8/2011 | Phillips et al. | |
| 8,016,708 | B2 * | 9/2011 | Diosi | F16H 3/66 475/276 |
| 8,333,676 | B2 * | 12/2012 | Kim | F16H 3/666 475/277 |
| 8,663,055 | B2 * | 3/2014 | Brehmer | F16H 3/66 475/282 |
| 9,309,951 | B1 * | 4/2016 | Cho | F16H 3/66 |

(Continued)

FOREIGN PATENT DOCUMENTS

| EP | 3034909 A1 * | 6/2016 | ............... F16H 3/66 |
| JP | 2015224756 A | 12/2015 | |
| KR | 101427977 | 8/2014 | |

OTHER PUBLICATIONS

Notice of Allowance dated Jan. 9, 2018, Notice of Allowance in corresponding Korean Patent Application 10-2016-0031478, Jan. 9, 2018; 5 pages.

*Primary Examiner* — Dirk Wright

(74) *Attorney, Agent, or Firm* — Lempia Summerfield Katz LLC

(57) ABSTRACT

A planetary gear train of an automatic transmission for a vehicle includes: an input shaft from an engine; an output shaft; and first, second, third, and fourth planetary gear sets each including three rotating elements. The gear train also includes eight shafts for selectively connecting the planetary gear sets and the input and output shafts in various configurations to achieve at least 11 forward speeds and at least one reverse speed.

8 Claims, 2 Drawing Sheets

(56) References Cited

U.S. PATENT DOCUMENTS

| | | | |
|---|---|---|---|
| 9,435,406 B2 * | 9/2016 | Cho | F16H 3/66 |
| 9,528,574 B2 * | 12/2016 | Cho | F16H 3/66 |
| 9,541,170 B2 * | 1/2017 | Cho | F16H 3/66 |
| 9,803,723 B2 * | 10/2017 | Haupt | F16H 3/66 |
| 2016/0333971 A1 * | 11/2016 | Cho | F16H 3/66 |
| 2016/0333973 A1 * | 11/2016 | Cho | F16H 3/66 |

* cited by examiner

FIG. 2

| Speed change stage | Control element | | | | | | Gear ratio |
|---|---|---|---|---|---|---|---|
| | C1 | C2 | C3 | C4 | B1 | B2 | |
| D1 |  | ● | ● |  |  | ● | 7.076 |
| D2 | ● | ● |  |  |  | ● | 4.500 |
| D3 |  | ● |  | ● |  | ● | 2.515 |
| D4 | ● |  |  | ● |  | ● | 1.706 |
| D5 |  |  | ● | ● |  | ● | 1.212 |
| D6 | ● | ● | ● | (○) |  |  | 1.000 |
| (D6) | ● | (○) | ● | ● |  |  | 1.000 |
| (D6) | (○) | ● | ● | ● |  |  | 1.000 |
| (D6) | ● | ● | (○) | ● |  |  | 1.000 |
| D7 |  |  | ● | ● | ● |  | 0.929 |
| D8 | ● |  |  | ● | ● |  | 0.812 |
| D9 |  | ● |  | ● | ● |  | 0.697 |
| D10 | ● | ● |  |  | ● |  | 0.565 |
| D11 |  | ● | ● |  | ● |  | 0.494 |
| REV1 | ● |  | ● |  |  | ● | -4.000 |
| REV2 | ● |  |  |  | ● | ● | -1.394 |
| (REV2) |  |  | ● |  | ● | ● | -1.394 | ated planetary gear train also improves silent driving by using an operation point set to a low engine rotation speed.

An embodiment of the present disclosure provides a planetary gear train of an automatic transmission for a vehicle including: an input shaft configured to receive power of an engine; an output shaft configured to output the power of the engine; a first planetary gear set including first, second, and third rotating elements; a second planetary gear set including fourth, fifth, and sixth rotating elements; a third planetary gear set including seventh, eighth, and ninth rotating elements; a fourth planetary gear set including tenth, eleventh, and, twelfth rotating elements; a first shaft configured to connect the first rotating element with the fourth rotating element; a second shaft configured to connect the second rotating element with the sixth rotating element; a third shaft configured to connect the third rotating element with the seventh rotating element; a fourth shaft connected with the fifth rotating element and directly connected with the input shaft; a fifth shaft configured to connect the eighth rotating element with the twelfth rotating element; a sixth shaft connected with the ninth rotating element and directly connected with the output shaft; a seventh shaft connected with the tenth rotating element, selectively connected with the second shaft, and selectively connected with the fourth shaft; and an eighth shaft connected with the eleventh rotating element, selectively connected with the second shaft, and selectively connected with the sixth shaft.

Further, in one embodiment of the present disclosure, the first shaft and the fifth shaft may be selectively connected with a transmission housing, respectively.

Moreover, the first, second, and third rotating elements of the first planetary gear set may be a first sun gear, a first ring gear, and a first planetary carrier, respectively. The fourth, fifth, and sixth rotating elements of the second planetary gear set may be a second sun gear, a second planetary carrier, and a second ring gear, respectively. The seventh, eighth, and ninth rotating elements of the third planetary gear set may be a third sun gear, a third planetary carrier, and a third ring gear, respectively. The tenth, eleventh, and twelfth rotating elements of the fourth planetary gear set may be a fourth sun gear, a fourth planetary carrier, and a fourth ring gear, respectively.

The planetary gear train of an automatic transmission for a vehicle may further include: a first clutch configured to selectively connect the fourth shaft with the seventh shaft; a second clutch configured to selectively connect the sixth shaft with the eighth shaft; a third clutch configured to selectively connect the second shaft with the seventh shaft; a fourth clutch configured to selectively connect the second shaft with the eighth shaft; a first brake configured to selectively connect the first shaft with the transmission housing; and a second brake configured to selectively connect the fifth shaft with the transmission housing.

An embodiment of the present disclosure may implement a speed change stage of at least eleven forward speeds and at least one reverse speed by combining four planetary gear sets including a simple planetary gear set with six control elements.

Further, an embodiment of the present disclosure may implement a speed change stage suitable for rotation speed of an engine by performing multi-stage speed changes of the automatic transmission, and may particularly improve silent driving by using an operation point set to a low engine rotation speed.

In addition, an embodiment of the present disclosure may maximize engine operation efficiency by utilizing high efficiency multi-stage speed changes, and may improve power delivery performance and fuel consumption.

Meanwhile, other various effects may be directly or indirectly disclosed in the following description of the embodiments of the present disclosure. In other words, various effects expected according to embodiments of the present disclosure are disclosed in the following detailed description.

BRIEF DESCRIPTION OF THE DRAWINGS

FIG. 2 is an operation table by speed change stages of a control element applied to a planetary gear train according to an exemplary embodiment of the present disclosure.

DETAILED DESCRIPTION OF THE EMBODIMENTS

Figure 1:
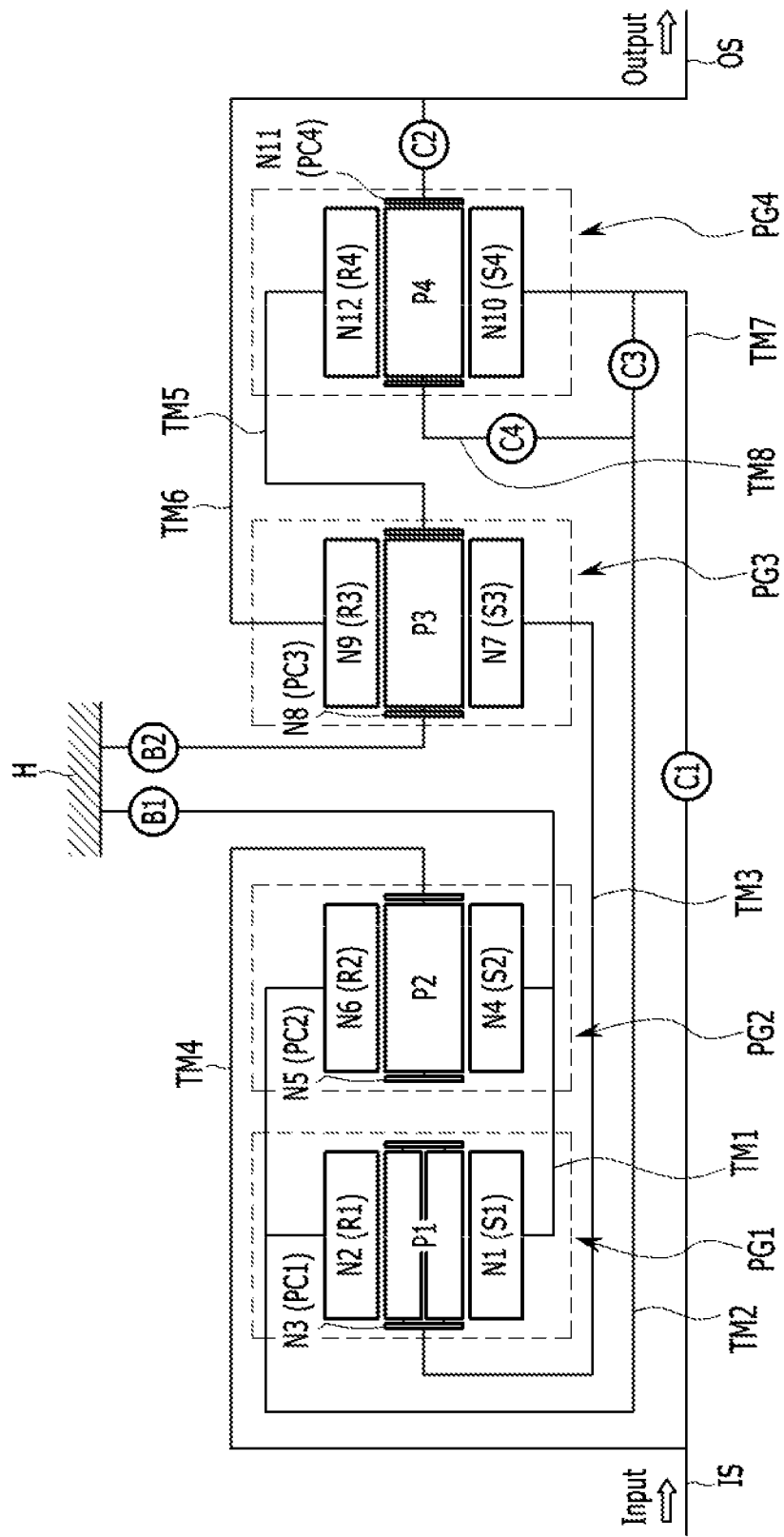
FIG. 1 is a schematic diagram illustrating a configuration of a planetary gear train according to an exemplary embodiment of the present disclosure.

It is desired to develop a planetary gear train capable of implementing speed change stages greater than the eighth speed, which may improve or bring about maximum efficiency with a small number of components in order to increase fuel efficiency through multiple speed stages or gear shifts. In this aspect, the present disclosure relates to a planetary gear train of an automatic transmission for a vehicle. The disclosed planetary gear train may improve power delivery performance and reduce fuel consumption by implementing speed change stages of at least eleven forward speeds and at least one reverse speed using a minimum configuration of internal components. The disclosed planetary gear train may also improve silent driving or reduce noise by using an operation point that is set to a low engine rotation speed.

Hereinafter, one embodiment of the present disclosure is described in detail with reference to the accompanying drawings. In the drawings, the following symbols are used to identify various elements of the disclosed embodiments, wherein:
i. B1 and B2 represent first and second brakes;
ii. C1, C2, C3, C4 represent first, second, third, and fourth clutches;
iii. PG1, PG2, PG3, PG4 represent first, second, third, and fourth planetary gear sets;
iv. S1, S2, S3, and S4 represent first, second, third, and fourth sun gears;
v. PC1, PC2, PC3, and PC4 represent first, second, third, and fourth planetary carriers;
vi. R1, R2, R3, and R4 represent first, second, third, and fourth ring gears;
vii. IS represents an input shaft;
viii. OS represents an output shaft; and
ix. TM1, TM2, TM3, TM4, TM5, TM6, TM7, and TM8 represent first, second, third, fourth, fifth, sixth, seventh, and eighth, shafts.

Accordingly, the drawings and description are to be regarded as illustrative in nature and not restrictive. Like reference numerals designate like elements throughout the specification. It will be understood that, although the terms such as first, second and third may be used herein to describe various elements, these elements should not be limited by these terms. These terms are used to distinguish one element from another and not to specify an order or particular arrangement of these elements.

FIG. 1 is a schematic diagram illustrating a configuration of a planetary gear train according to one embodiment of the present disclosure.

Referring to FIG. 1, a planetary gear train according to one embodiment of the present disclosure includes first, second, third, and fourth planetary gear sets PG1, PG2, PG3, and PG4 coaxially disposed. In one embodiment, the planetary gear train also includes: an input shaft IS; an output shaft OS; eight shafts TM1-TM8 configured to connect respective rotation elements of the first, second, third, and fourth planetary gear sets PG1, PG2, PG3, and PG4 to each other; four clutches C1-C4 being control, elements; two brakes B1 and B2 also being control elements; and a transmission housing H.

Further, rotating power produced by an engine and transmitted from the input shaft IS is changed by cooperation of the first, second, third, and fourth planetary gear sets PG1, PG2, PG3, and PG4. The changed rotating power is output through the output shaft OS.

In this embodiment, respective planetary gear sets are arranged in the order of the first, second, third, and fourth planetary gear sets PG1, PG2, PG3, and PG4 from an engine side.

The input shaft IS may be an input member. Rotating power from a crank shaft of the engine may be input by performing torque conversion through a torque converter.

The output shaft OS may be an output member. The output shaft OS may be coaxially disposed with respect to the input shaft IS so that a changed driving torque may be transferred to a drive shaft through a differential apparatus.

In this embodiment, the first planetary gear set PG1 is a pinion planetary gear set. The first planetary gear set PG1 includes: a first sun gear S1 being a first rotating element N1; a first ring gear R1 being a second rotating element N2 inscribed with a first pinion gear P1 the first pinion gear P1 circumscribed with the first sun gear S1; and a first planetary carrier PC1 being a third rotating element N3 configured to rotatably support the first pinion P1 circumscribed with the first sun gear S1.

The second planetary gear set PG2 is a single pinion planetary gear set. The second planetary gear set PG2 includes: a second sun gear S2 being a fourth rotating element N4; a second planetary carrier PC2 being a fifth rotating element N5 configured to rotatably support a second pinion gear P2 circumscribed with the second sun gear S2; and a second ring gear R2 being a sixth rotating element N6 inscribed with the second pinion gear P2.

The third planetary gear set PG3 is a single pinion planetary gear set. The third planetary gear set PG3 includes: a third sun gear S3 being a seventh rotating element N7; a third planetary carrier PC3 being an eighth rotating element N8 configured to rotatably support a third pinion gear P3 circumscribed, with the third, sun gear S3; and a third ring gear R3 being a ninth rotating element N9 inscribed with the third pinion gear P3.

The fourth planetary gear set PG4 is a single pinion planetary gear set. The fourth planetary gear set PG4 includes: a fourth sun gear S4 being a tenth rotating element N10; a fourth planetary carrier PC4 being an eleventh rotating element N11 configured to rotatably support a fourth pinion gear P4 circumscribed with the fourth sun gear S4; and a fourth ring gear R4 being a twelfth rotating element N12 inscribed, with the fourth pinion gear P4.

In this embodiment, the first, second, third, and fourth planetary gear sets PG1, PG2, PG3, and PG4 are operated to include eight total shafts TM1-TM8. The shafts TM1-TM8 are employed such that where the first rotating element N1 is directly connected with the fourth rotating element N4, the second rotating element N2 is directly connected with the sixth rotating element N6, the third rotating element N3 is directly connected with the seventh rotating element N7, and the eighth rotating element N8 is directly connected with the twelfth rotating element N12.

A configuration of the eight shafts TM1-TM8 is described in detail below.

Each of the eight shafts TM1-TM8 may include a rotating member configured to transfer power while being rotated together with a rotating element to directly or selectively connect a plurality of rotating elements among the rotating elements of the planetary gear sets PG1, PG2, PG3, and PG4. Each of the eight shafts TM1-TM8 may also include a fixing member configured to fix the rotating elements by directly connecting the rotating elements with the transmission housing H.

In this embodiment, the first shaft TM1 is a selective fixing element by directly connecting the first rotating element N1 (first sun gear S1) with the fourth rotating element N4 (second sun gear S2) to be selectively connected with the transmission housing H.

In this embodiment, the second shaft TM2 directly connects the second rotating element N2 (first ring gear R1) with the sixth rotating element N6 (second ring gear R2).

In this embodiment, the third shaft TM3 directly connects the third rotating element N3 (first planetary carrier PC1) with the seventh rotating element N7 (third sun gear S3).

In this embodiment, the fourth shaft TM4 is connected with the fifth rotating element N5 (second planetary carrier PC2) and is directly connected with the input shaft IS to be continuously operated as an input element.

In this embodiment, the fifth shaft TM5 is operated as a selective fixing element by directly connecting the eighth rotating element N8 (third planetary carrier PC3) with the twelfth rotating element N12 (fourth ring gear R4) to be selectively connected with the transmission housing H.

In this embodiment, the sixth shaft TM6 is connected with the ninth rotating element N9 (third ring gear R3) and is directly connected with the output shaft OS to be continuously operated as an output element.

In this embodiment, the seventh shaft TM7 is connected with the tenth, rotating element N10 (fourth sun gear S4) and is selectively is connected with the second shaft TM2 and the fourth shaft TM4, respectively. In this embodiment, the seventh shaft TM7 is selectively connected with the fourth shaft TM4, the fourth shaft TM4 being directly connected with the input shaft IS to be operated as a selective input element.

In this embodiment, the eighth shaft TM8 is connected with the eleventh rotating element N11 (fourth planetary carrier PC4) and is selectively connected with the second shaft TM2 and the sixth shaft TM6, respectively.

Further, in this embodiment, among the eight shafts TM1-TM8, four clutches C1, C2, C3, and C4, which are control elements, are disposed at selectively axially connected regions to selectively connect to the input shaft IS and the output shaft OS.

In addition, in this embodiment, among the eight shafts TM1-TM8, two brakes B1 and B2 are disposed at a region in which any one shaft and the transmission housing H are selectively connected with each other.

The placement of the four clutches C1-C4 and the two brakes B1 and B2 are described below.

In this embodiment, the first clutch C1 is disposed between the fourth shaft TM4 and the seventh shaft TM7 to transfer power by selectively connecting the fourth shaft TM4 and the seventh shaft TM7 to each other.

In this embodiment, the second clutch C2 is disposed between the sixth shaft TM6 and the eighth shaft TM8 to transfer power by selectively connecting the sixth shaft TM6 and the eighth shaft TM8 to each other.

In this embodiment, the third clutch C3 is disposed between the second shaft TM2 and the seventh shaft TM7 to transfer power by selectively connecting the second shaft TM2 with the seventh shaft TM7.

In this embodiment, the fourth clutch C4 is disposed between the second shaft TM2 and the eighth shaft TM8 to transfer power by selectively connecting the second, shaft TM2 with the eighth shaft TM8.

In this embodiment, the first brake B1 is disposed between the first shaft TM1 and the transmission housing H to selectively fix the first shaft TM1 by selectively connecting the first shaft TM1 with the transmission housing H.

In this embodiment, the second, brake B2 is disposed between the fifth shaft TM5 and the transmission housing H to selectively fix the fifth shaft TM5 by selectively connecting the fifth shaft TM5 with the transmission housing H.

In this embodiment, the first clutch C1 selectively connects the fourth shaft TM4 with the seventh shaft TM7. However, since the fourth shaft TM4 is directly connected with the input shaft IS in this embodiment, as shown in FIG. 1, the first clutch C1 may be configured to connect the input shaft IS with the seventh shaft TM7.

As described above, each control element, including the first, second, third, and fourth clutches C1, C2, C3, and C4, and the first and second brakes B1 and B2 may be configured as a multi-plate hydraulic pressure friction coupling unit which is friction-coupled by hydraulic pressure.

FIG. 2 is an operation table by speed change stages of the control elements applied to a planetary gear train according to one embodiment of the present disclosure.

Referring to FIG. 2, the planetary gear train according to one embodiment of the present disclosure performs speed changes of one reverse speed and eleven forward speeds by operating three of the control elements among the first, second, third, and fourth clutches C1, C2, C3, and C4 and the first and second brakes B1 and B2 in each speed change stage. The speed change procedure of one embodiment is described below.

In this embodiment, in a first forward speed change stage D1, the second and third clutches C2 and C3 and the second brake B2 are simultaneously operated.

Accordingly, power is input to the fourth shaft TM4 in a state where the sixth shaft TM6 is connected with the eighth shaft TM8 by operating the second, clutch C2 and the second shaft TM2 is connected with the seventh shaft TM7 by operating the third clutch C3. When the fifth shaft TM5 is operated as a fixing element by operating the second brake B2, the first forward speed change is performed and the power is output to the output shaft OS connected with the sixth shaft TM6.

In this embodiment, in the second forward speed change stage D2, the first and third clutches C1 and C3 and the second brake B2 are simultaneously operated.

Accordingly, power is input to the fourth shaft TM4 and the seventh shaft TM7 in a state where the fourth shaft TM4 is connected with the seventh shaft TM7 by operating the first clutch C1 and where the second shaft TM2 is connected with the seventh shaft TM7 by operating the third clutch C3. When the fifth shaft TM5 is operated as a fixing element by operating the second brake B2, the second forward speed change is performed and the power is output to the output shaft OS connected with the sixth shaft TM6.

In this embodiment, in the third forward speed change stage D3, the second and fourth clutches C2 and C4 and the second brake B2 are simultaneously operated.

Accordingly, power is input to the fourth shaft TM4 in a state where the sixth shaft TM6 is connected with the eighth shaft TM8 by operating the second, clutch C2 and where the second shaft TM2 is connected with the eighth shaft TM8 by operating the fourth clutch C4. When the fifth shaft TM5 is operated as a fixing element by operating the second brake B2, the third forward speed change is performed and the power is output to the output shaft OS connected with the sixth shaft TM6.

In this embodiment, in the fourth forward speed change stage D4, the first and fourth clutches C1 and C4 and the second brake B2 are simultaneously operated.

Accordingly, power is input to the fourth shaft TM4 and the seventh shaft TM7 in a state where the fourth shaft TM4 is connected with the seventh shaft TM7 by operating the first clutch C1 and where the second shaft TM2 is connected with the eighth shaft TM8 by operating the fourth clutch C4. When the fifth shaft TM5 is operated as a fixing element by operating the second brake B2, the fourth forward speed change is performed and the power is output to the output shaft OS connected with the sixth shaft TM6.

In this embodiment, in the fifth forward speed change stage D5, the third and fourth clutches C3 and C4 and the second brake B2 are simultaneously operated.

Accordingly, power is input to the fourth shaft TM4 in a state where the second shaft TM2 is connected with the seventh shaft TM7 by operating the third clutch C3 and where the second shaft TM2 is connected with the eighth shaft TM8 by operating the fourth clutch C4. When the fifth shaft TM5 is operated as a fixing element by operating the second brake B2, the fifth forward speed change is performed, and the power is output to the output shaft OS connected with the sixth shaft TM6.

In this embodiment, in the sixth forward speed change stage D6, the first, second, and third clutches C1, C2, and C3 are simultaneously operated.

Accordingly, the fourth shaft TM4 is connected with the seventh shaft TM7 by operating the first clutch C1, the sixth shaft TM6 is connected with the eighth shaft TM8 by operating the second clutch C2, and the second shaft T2 is connected with the seventh shaft TM7 by operating the third clutch C3 so that the third and fourth planetary gear sets PG3 and PG4 are integral with each other to be rotated as one. In this state, when the power is input to the fourth shaft TM4 and the seventh shaft TM7, the sixth forward speed change is performed, and the power is output to the output shaft OS connected with the sixth shaft TM6.

In this embodiment, in the sixth forward speed change stage D6, if three of the first, second, third, and fourth clutches C1, C2, C3, and 04 are operated, the sixth forward speed change stage having the same gear ratio as described above may be implemented.

In this embodiment, in the seventh forward speed change stage D7, the third and fourth clutches C3 and C4 and the first brake B1 are simultaneously operated.

Accordingly, power is input to the fourth shaft TM4 in a state where the second shaft TM2 is connected with the seventh shaft TM7 by operating the third clutch C3 and where the second shaft TM2 is connected with the eighth shaft TM8 by operating the fourth clutch C4. When the first shaft TM1 is operated as a fixing element by operating the first brake B1, the seventh forward speed change is per-formed, and the power is output to the output shaft OS connected with the sixth shaft TM6.

In this embodiment, in the eighth forward speed change stage D8, the first and fourth clutches C1 and C4 and the first brake B1 are simultaneously operated.

Accordingly, the power is input to the fourth shaft TM4 and the seventh shaft TM7 in a state where the fourth shaft TM4 is connected with the seventh shaft TM7 by operating the first clutch C1 and where the second shaft TM2 is connected with the eighth shaft TM8 by operating the fourth clutch C4. When the first shaft TM1 is operated as a fixing element by operating the first brake B1, the eighth forward speed change is performed, and the power is output to the output shaft OS connected with the sixth shaft TM6.

In this embodiment, in the ninth forward speed change stage D9, the second and fourth clutches C2 and C4 and the first brake B1 are simultaneously operated.

Accordingly, power is input to the fourth shaft TM4 in a state where the sixth shaft TM6 is connected with the eighth shaft TM8 by operating the second clutch C2 and where the second shaft TM2 is connected with the eighth shaft TM8 by operating the fourth clutch C4. When the first shaft TM1 is operated as a fixing element by operating the first brake B1, the ninth forward speed change is performed, and the power is output to the output shaft OS connected with the sixth shaft TM6.

In this embodiment, in the tenth forward speed change stage D10, the first and second clutches C1 and C2 and the first brake B1 are simultaneously operated.

Accordingly, power is input to the fourth shaft TM4 and the seventh shaft TM7 in a state where the fourth shaft TM4 is connected with the seventh shaft TM7 by operating the first clutch C1 and where the sixth shaft TM6 is connected with the eighth shaft TM8 by operating the second clutch C2. When the first shaft TM1 is operated as a fixing element by operating the first brake B1, the tenth forward speed change is performed, and the power is output to the output shaft OS connected with the sixth shaft TM6.

In this embodiment, in the eleventh forward speed change stage D11, the second and third clutches C2 and C3 and the first brake B1 are simultaneously operated.

Accordingly, power is input to the fourth shaft TM4 in a state where the sixth shaft TM6 is connected with the eighth shaft TM8 by operating the second clutch C2 and where the second shaft TM2 is connected with the seventh shaft TM7 by operating the third clutch C3. When the first shaft TM1 is operated as a fixing element by operating the first brake B1, the eleventh forward speed change is performed, and the power is output to the output shaft OS connected with the sixth shaft TM6.

In this embodiment, in the first reverse speed change stage REV1, the first and third clutches C1 and C3 and the second brake B2 are simultaneously operated.

Accordingly, power is input to the fourth shaft TM4 and the seventh shaft TM7 in a state where the fourth shaft TM4 is connected with the seventh shaft TM7 by operating the first clutch C1 and where the second shaft TM2 is connected with the seventh shaft TM7 by operating the third clutch C3. When the fifth shaft TM5 is operated as a fixing element by operating the second brake B2, the first reverse speed change is performed, and the reverse rotating power is output to the output shaft OS connected with the sixth shaft TM6.

In this embodiment, in the second reverse speed change stage REV2, the first clutch C1 and the first and second brakes B1 and B2 are simultaneously operated.

Accordingly, power is input to the fourth shaft TM4 and the seventh shaft TM7 in a state where the fourth shaft TM4 is connected with the seventh shaft TM7 by operating the first clutch C1. When the first shaft TM1 and the fifth shaft TM5 are operated as a fixing element by operating the first and second brakes B1 and B2, the second reverse speed change is performed, and reverse rotating power is output to the output shaft OS connected with the sixth shaft TM6.

In this embodiment, in the second reverse speed change stage REV2, even if the third clutch C3 is operated instead of the first clutch C1, the second reverse speed change stage may be implemented due to the same gear ratio.

As described above, the planetary gear train according to one embodiment of the present disclosure may realize speed change stages of at least eleven forward speeds and at least one reverse speed by controlling operation of four planetary gear sets PG1, PG2, PG3, and PG4, four clutches C1, C2, C3, and C4, and two brakes B1 and B2.

In addition, the planetary gear train according to one embodiment of the present disclosure may implement a speed change stage suitable for rotation speed of an engine by performing multi-stage speed changes of the automatic transmission. The planetary gear train according to one embodiment may also particularly improve silent driving, i.e. reduce powertrain noise, using an operation point set to a low engine rotation speed.

Moreover, the planetary gear train according to one embodiment of the present disclosure may maximize engine operation efficiency by utilizing high efficiency multi-stage speed changes, and may improve power delivery performance and fuel consumption.

While this disclosure has been described in connection with what are presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A planetary gear train of an automatic transmission for a vehicle, the planetary gear train comprising:
    an input shaft configured to receive power of an engine;
    an output shaft configured to output the power of the engine;
    a first planetary gear set including a first, a second, and a third rotating element;
    a second planetary gear set including a fourth, a fifth, and a sixth rotating element;
    a third planetary gear set including a seventh, an eighth, and a ninth rotating element;
    a fourth planetary gear set including a tenth, an eleventh, and a twelfth rotating element;
    a first shaft configured to connect the first rotating element with the fourth rotating element;
    a second shaft configured to connect the second rotating element with the sixth rotating element;
    a third shaft configured to connect the third rotating element with the seventh rotating element;
    a fourth shaft connected with the fifth rotating element and directly connected with the input shaft;
    a fifth shaft configured to connect the eighth rotating element with the twelfth rotating element;
    a sixth shaft connected with the ninth rotating element and directly connected with the output shaft;
    a seventh shaft connected with the tenth rotating element, selectively connected with the second shaft, and selectively connected with the fourth shaft; and
    an eighth shaft connected with the eleventh rotating element, selectively connected with the second shaft, and selectively connected with the sixth shaft.

2. The planetary gear train of claim 1, wherein the first shaft and the fifth shaft are each selectively connected with a transmission housing.

3. The planetary gear train of claim 1, wherein the first, second, and third rotating elements of the first planetary gear set are a first sun gear, a first ring gear, and a first planetary carrier, respectively,
    the fourth, fifth, and sixth rotating elements of the second planetary gear set are a second sun gear, a second planetary carrier, and a second ring gear, respectively,
    the seventh, eighth, and ninth rotating elements of the third planetary gear set are a third sun gear, a third planetary carrier, and a third ring gear, respectively, and
    the tenth, eleventh, and twelfth rotating elements of the fourth planetary gear set are a fourth sun gear, a fourth planetary carrier, and a fourth ring gear, respectively.

4. The planetary gear train of claim 2, further comprising:
    a first clutch configured to selectively connect the fourth shaft with the seventh shaft;
    a second clutch configured to selectively connect the sixth shaft with the eighth shaft;
    a third clutch configured to selectively connect the second shaft with the seventh shaft;
    a fourth clutch configured to selectively connect the second shaft with the eighth shaft;
    a first brake configured to selectively connect the first shaft with the transmission housing; and
    a second brake configured to selectively connect the fifth shaft with the transmission housing.

5. A planetary gear train of an automatic transmission for a vehicle, the planetary gear train comprising:
    an input shaft configured to receive power of an engine;
    an output shaft configured to output the power of the engine;
    a first planetary gear set including a first, a second, and a third rotating element;
    a second planetary gear set including a fourth, a fifth, and a sixth rotating element;
    a third planetary gear set including a seventh, an eighth, and a ninth rotating element; and
    a fourth planetary gear set including a tenth, an eleventh, and a twelfth rotating element,
    wherein the input shaft is directly connected with the fifth rotating element,
    the output shaft is directly connected with the ninth rotating element,
    the first rotating element is directly connected with the fourth rotating element,
    the second rotating element is directly connected with the sixth rotating element,
    the third rotating element is directly connected with the seventh rotating element,
    the eighth rotating element is directly connected with the twelfth rotating element,
    the tenth rotating element is selectively connected with each of the second rotating element and the fifth rotating element, and
    the eleventh rotating element is selectively connected with each of the second rotating element and the ninth rotating element.

6. The planetary gear train of claim 5, wherein the first rotating element and the eighth rotating element are each selectively connected with a transmission housing.

7. The planetary gear train of claim 5, wherein the first, second, and third rotating elements of the first planetary gear set are a first sun gear, a first ring gear, and a first planetary carrier, respectively,
- the fourth, fifth, and sixth rotating elements of the second planetary gear set are a second sun gear, a second planetary carrier, and a second ring gear, respectively,
- the seventh, eighth, and ninth rotating elements of the third planetary gear set are a third sun gear, a third planetary carrier, and a third ring gear, respectively, and
- the tenth, eleventh, and twelfth rotating elements of the fourth planetary gear set are a fourth sun gear, a fourth planetary carrier, and a fourth ring gear, respectively.

8. The planetary gear train of claim 6, further comprising:
- a first clutch configured to selectively connect the fifth rotating element with the tenth rotating element;
- a second clutch configured to selectively connect the ninth rotating element with the eleventh rotating element;
- a third clutch configured to selectively connect the second rotating element with the tenth rotating element;
- a fourth clutch configured to selectively connect the second rotating element with the eleventh rotating element;
- a first brake configured to selectively connect the first rotating element with the transmission housing; and
- a second brake configured to selectively connect the eighth rotating element with the transmission housing.

* * * * *